United States Patent
Stair

[15] 3,704,801
[45] Dec. 5, 1972

[54] FALLING TREE CONTROLLER AND IMPROVED MOWER CUTTING DEVICE

[72] Inventor: Eugene V. Stair, Box 238, Caddo, Okla. 74729

[22] Filed: Nov. 4, 1970

[21] Appl. No.: 86,735

[52] U.S. Cl. ............................144/34 A, 143/43 N
[51] Int. Cl. .............................................A01g 23/02
[58] Field of Search............56/255, 295; 144/34 A; 143/43 N, 141, 145, 159

[56] References Cited

UNITED STATES PATENTS

| | | | |
|---|---|---|---|
| 3,483,905 | 12/1969 | Lawrence | 144/34 A |
| 3,482,380 | 12/1969 | Stair | 56/295 |
| 3,538,692 | 11/1970 | Cope et al. | 56/295 |
| 1,414,319 | 4/1922 | Zalauskis | 143/43 N |
| 2,872,770 | 2/1959 | Murphey et al. | 56/295 |
| 2,426,694 | 9/1947 | King | 143/43 N |

*Primary Examiner*—Gerald A. Dost
*Attorney*—Strauch, Nolan, Neale, Nies & Kurz

[57] ABSTRACT

A mowing apparatus including rotating cutter assemblies having replaceable cutter plates each formed with a number of saw teeth, with the teeth being arranged in groups or sets on different cutting diameters. The cutter mechanism has a housing with specific structure which cooperates with a directional falling tree controller and a hook section on the cutter assembly to discharge the cut material to one side of the mowing apparatus out of its path of advancement.

26 Claims, 10 Drawing Figures

PATENTED DEC 5 1972

INVENTOR
EUGENE V. STAIR

BY Strauch, Nolan Neale, Nies & Kurz
ATTORNEYS

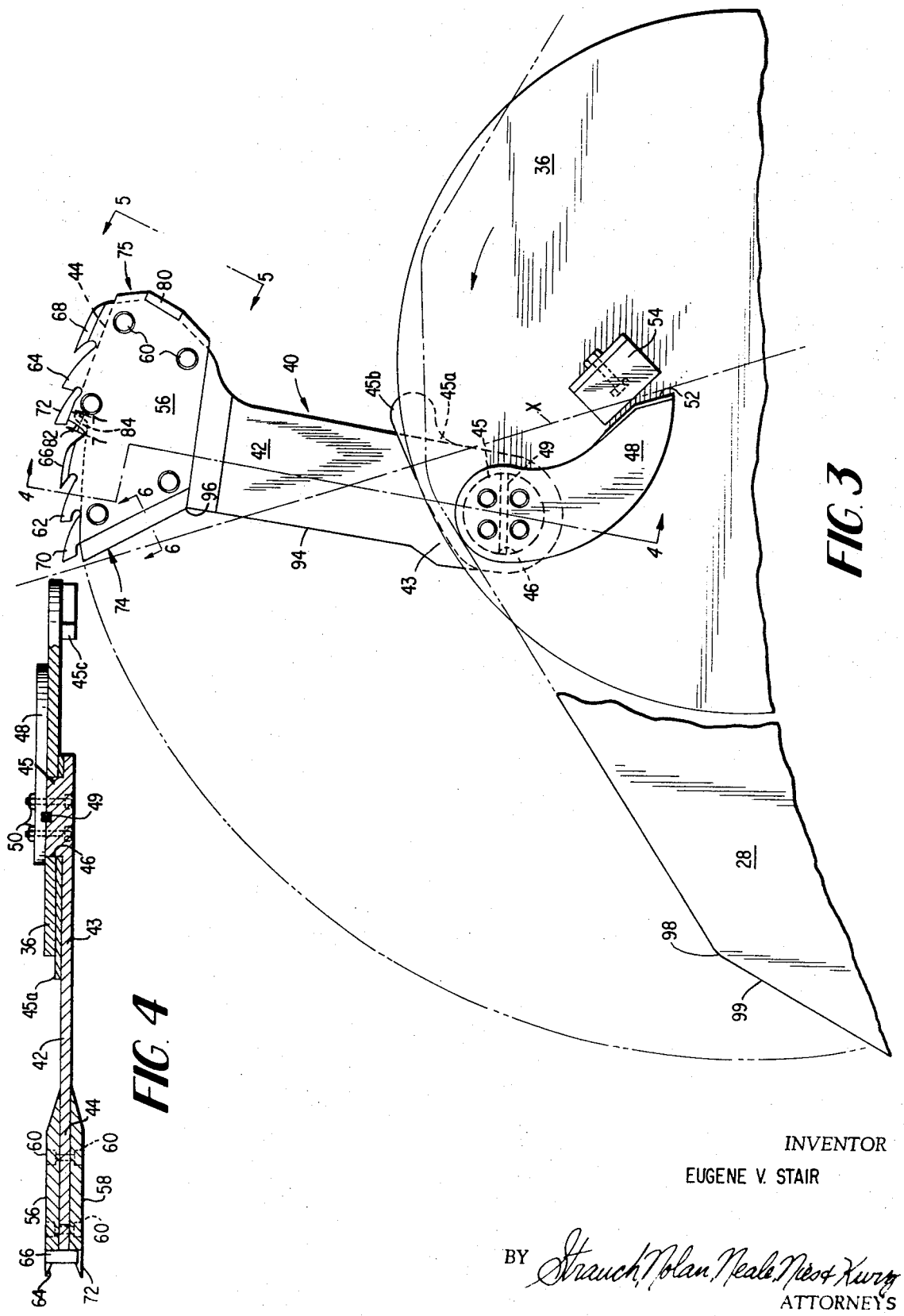

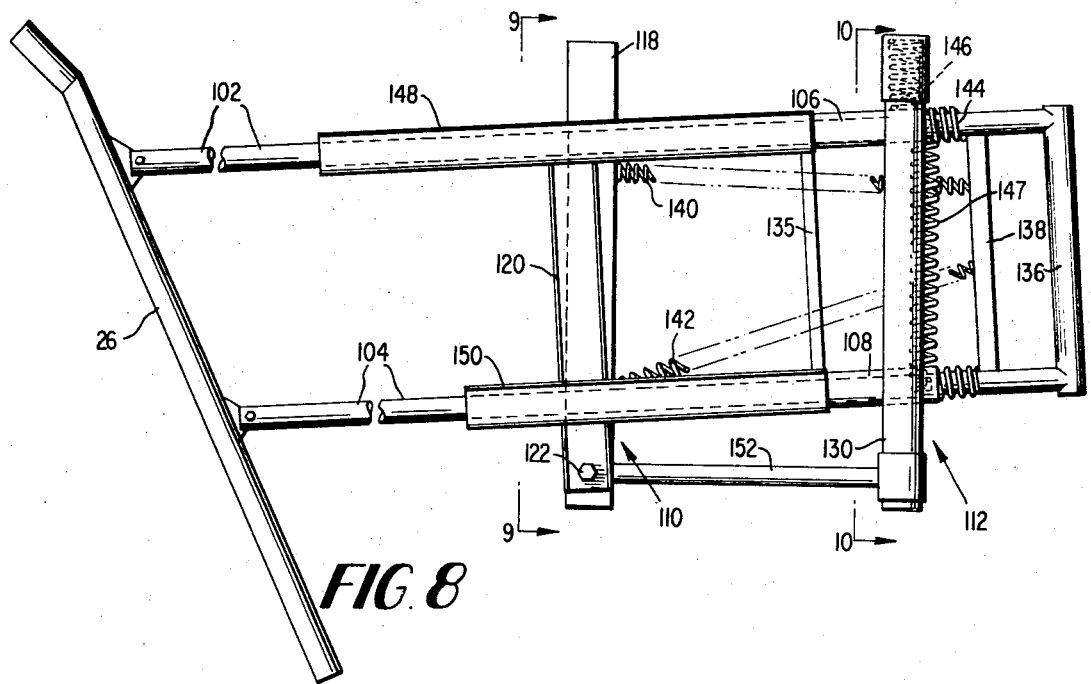

3,704,801

FALLING TREE CONTROLLER AND IMPROVED MOWER CUTTING DEVICE

BACKGROUND OF THE INVENTION

This invention relates generally to cutting devices and more particularly to a novel rotary mower device suitable for use in clearing land covered by heavy brush, trees, etc, thus making the land suitable for use as a roadway or grazing land for ranch animals, etc.

Conventional mower devices now used for landclearing purposes are limited by their inability to quickly cut large brush and trees and their tendency to frequently bind and become jammed during operation. Consequently, the horsepower requirements and the repair and replacement costs of the cutting elements for conventional machines are excessively high.

In addition, conventional machines simply are not able to perform the clearing operations within acceptable time periods. Besides being unable to quickly cut through larger trees, conventional mowers do not provide adequate means for removing the already cut material from the path along which the mower is advancing. Thus, operation of the mower must be interrupted frequently to enable the path to be cleared.

SUMMARY OF THE INVENTION

Accordingly, a primary object of the invention resides in the provision of a novel mowing device which overcomes the problems associated with prior conventional machines. The novel mower quickly and efficiently cuts through vegetation of all sizes including large trees by the use of replaceable saw tooth plate assemblies on a rotating arm, while at the same time clearing the path along which the mower is advancing by a falling tree controller device and housing structure which cooperate with the cutting plate assembly to direct the cut trees to one side of the mower out of its path of advancement.

Another object of the invention resides in the provision of a novel mowing device having a rotating cutting assembly including a knife-like edge formed on its leading edge and a plurality of saw teeth on its outer peripheral edge. The cutting assembly is formed by a pair of replaceably upper and lower plates mounted on a rotating support arm, with the plates having saw teeth on their outer peripheral edges and with some of the teeth arranged on different cutting diameters than others. Along the leading edge of the cutting assembly, a V-shaped hook portion is found between the knife-edge and adjoining edge of the support arm and the hook portion assists in carrying a cut tree trunk away to the discharge side of the mower out of its path of advancement.

Still another object of the invention resides in the provision of a novel mowing device which includes a falling-tree controller that applies an automatically controlled force against a tree while the tree is being cut and then assists in directing the cut tree trunk to the discharge side of the mower out of the mower's path of movement. The falling-tree controller is automatically spring operated and requires no manual operation by the operator. Following initial engagement of the controller with a tree or trees, the mower continues to advance and the biasing force applied against the tree increases until the cutting assembly begins to cut. Thereafter, the biasing force is automatically adjusted as needed until the tree is felled. In this way, the operator need not be concerned with the biasing force and no energy is wasted in providing an excessive amount of force.

Still another object resides in the provision of a novel housing construction for the mower, the housing cooperating with the above mentioned falling-tree controller and hook portion of the cutter assembly to direct fallen trees to the discharge side of the mower out of the normal path of advancement of the mower.

Other objects and advantages will become more apparent from reading the following description of a preferred embodiment of the invention as it is described relative to the associated drawings, in which like numerals indicate like elements.

BRIEF DESCRIPTION OF THE DRAWINGS

FIG. 3 is an enlarged fragmentary top plan view of the cutter mechanism, illustrating particularly a cutter assembly and its relation to the housing structure of the cutter mechanism;

FIG. 4 is a fragmentary sectional view taken generally along 4—4 of FIG. 3, and illustrating a cutting assembly including the replaceable saw tooth plates;

FIG. 5 is a fragmentary view taken along line 5—5 of FIG. 3, and illustrating the particular construction of the replaceable saw tooth plates along their trailing edges;

FIG. 6 is a fragmentary sectional view taken generally along line 6—6 of FIG. 3 illustrating the knife-like construction of the lower replaceable cutter plate along its leading edge;

FIG. 7 is a fragmentary sectional view taken along line 7—7 of FIG. 3;

FIG. 8 is a fragmentary top view of the falling-tree controller shown in FIGS. 1 and 2;

FIG. 9 is a fragmentary sectional view taken along line 9—9 of FIG. 8; and

FIG. 10 is a fragmentary sectional view taken along line 10—10 of FIG. 8.

DETAILED DESCRIPTION OF THE INVENTION

Figure 1:
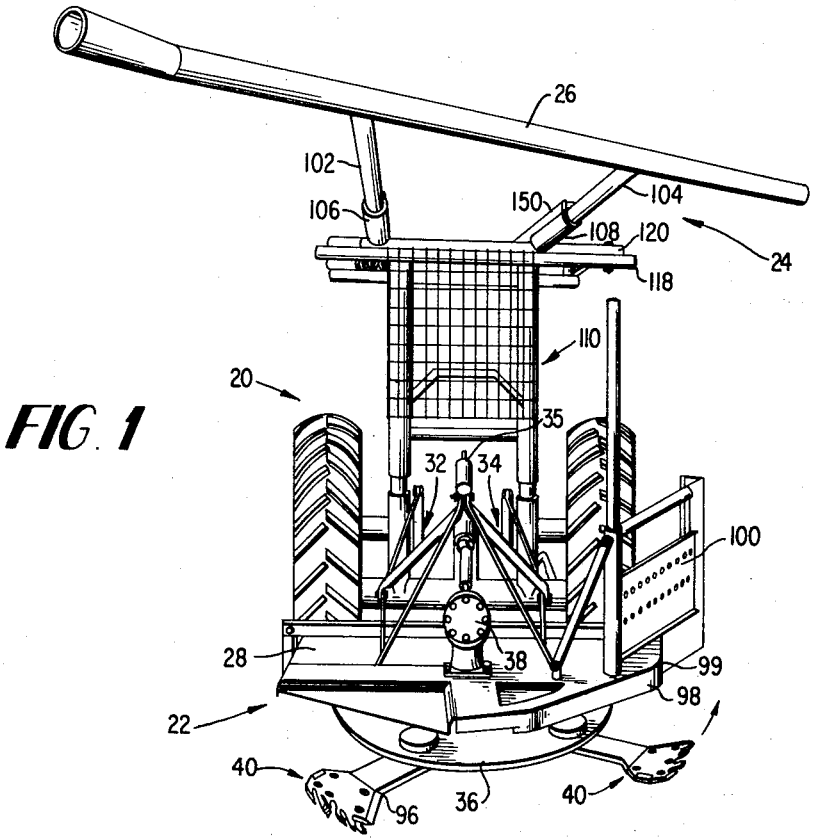
FIG. 1 is a perspective view of the invention taken generally from the front of the mowing machine.
Figure 2:
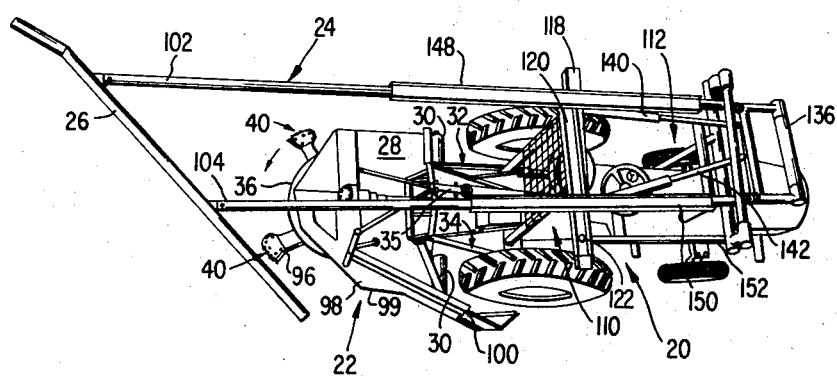
FIG. 2 is a perspective view taken generally from the top of the mowing device.

Referring now to FIGS. 1 and 2, the mowing machine of the invention comprises a mobile vehicle 20, such as a conventional farm tractor, a rotating cutting mechanism 22 mounted at the rear end of vehicle 20, and a falling-tree controller 24 mounted on top of the vehicle above the seating area for the operator.

Generally, as the vehicle is placed in reverse gear and advanced toward a tree or trees, the angled polished pusher bar 26 of controller 24 engages a tree or trees and places a biasing force against the tree through its spring loaded mechanism described below. The cutters of mechanism 22 then proceed to cut through the tree trunk immediately adjacent ground level, and the cut tree is finally felled to a predetermined discharge side of the vehicle, (the right side as viewed in FIG. 1) by bar 26 and cooperating structure on cutter mechanism 22 described hereinafter.

Cutter mechanism 22 includes a rigid housing 28 supported at ground level by a pair of gauge rollers 30 and connected to the main frame of vehicle 20 by suitable connecting rod assemblies 32 and 34, and a hydraulic depth control assembly 35 for adjusting the working height of mechanism 22. A rotating support disc 36 is positioned beneath housing 28 and is rotatably mounted in the central region of the housing via a shaft driven through a gear box 38 which is drive connected to the main drive system of the vehicle. A plurality of cutter assemblies 40 are connected to the rotating disc 36 for performing the cutting function in a generally horizontal plane.

As shown best in FIGS. 3 and 4, each cutter assembly 40 includes a support arm 42 having an inner portion 43 and outer end portion 44. An upwardly extending circular lug or pin 45 is formed at the inner end of portion 43, with lug 45 being rotatably mounted in an opening 46 in disc 36 adjacent its outer edge. A shim 45a fits between disc 36 and arm portion 43 and is welded to arm portion 43 and lug 45. The shim has a projecting end 45b. A lock member 48 slidably rests on the top of disc 36 and is fastened to arm 42 by a key 49 and a plurality of nut and bolt assemblies 50 which extend down through member 48, lug 45 and arm portion 43. Member 48 has an abutment end 52 which normally engages a rubber-filled stop cushion 54 mounted on the top of disc 36 as the disc rotates and the arm 42 approaches the tree or other material to be cut. In this way, the approach angle of the arm 42 and cutters mounted thereon relative to disc 36 and the tree is fixed as the disc rotates counterclockwise as viewed in FIG. 3. However, if for some reason the cutters become jammed against a tree or other obstacle, the arm 42, shim 45a and member 48 are free to pivot clockwise and swing backwardly under disc 36 as viewed in FIG. 3 until projection 45b engages a stop cushion 45c on the underside of disc 36, since lug 45 is rotatable in opening 46. This feature prevents breakage of the various components of cutter assembly 40.

Upper and lower replaceable cutting saw tooth plates 56 and 58 are mounted on the top and bottom respectively, of the outer arm portion 44 with a plurality of countersunk bolt assemblies 60 holding the plates on arm portion 44. A number of cutting teeth may be formed on the outer periphery of each plate 56, 58 as needed, but generally a small number of teeth have been found satisfactory. For example, in FIGS. 3 and 4, the peripheral edge of upper plate 56 has a pair of cross-cut teeth 62 and 64 and a pair of rip saw teeth 66 and 68 formed thereon. Lower plate 58 merely has a pair of cross-cut teeth 70 and 72 formed on its peripheral edge.

It should be particularly noted that the teeth are arranged in groups or sets on different cutting diameters around which they rotate. For example, a first group of teeth closest to the leading knife-edge 74, i.e., teeth 70, 62 and 66, define a circular cutting path which is smaller in diameter than that defined by a second group of teeth adjacent the trailing edge 75, i.e., teeth 72, 64 and 68. Consequently, as the cutting assembly passes through a tree, a first cut will be taken by the first group including teeth 70, 62 and 66, followed immediately by a second cut taken by the second group of teeth 72, 64 and 68.

The arrangement of the teeth within a group cutting on a common diameter is also significant. For example, in FIG. 3 cross-cut teeth 70 and 72 ordinarily would be designed to cut upwardly and cross-cut teeth 62 and 64 would ordinarily be designed to cut downwardly as they passed through a tree. Because teeth 70 and 62 are cutting on the same diameter, there will be less down-whip or up-whip forces imposed on the cutter assembly and thus less tendency for the teeth to jam and/or the plates and arm 42 to break. The same is true of cross-cut teeth 64 and 72 which cut along the same diameter.

The rip saw teeth 66 and 68 advantageously cut the long grain in roots which lead up to the tree trunk and also function to remove the shavings produced by the cross-cut teeth which are cutting immediately ahead of the rip saw teeth.

This particular arrangement of teeth in groups cutting along different diameters has been found superior to an arrangement in which each individual tooth is cutting on a different diameter. In the latter arrangement, conditions may arise at high and variable travel operating speeds creating an excessive amount of down- or up-whip forces. For example, when the travel speed is such so as to have two up-cutting teeth pulling against one down-cutting tooth, or vice versa, an excessive down-whip or up-whip force may arise. Such conditions are alleviated by the arrangement of teeth in groups described above.

To prevent any shear forces from being imposed upon bolt assemblies 60 during the cutting action of the teeth, plates 56 and 58 are provided with a number of vertical flanges which abut against cooperating vertical faces on arm portion 44 to thereby transmit the shear forces directly to the arm. For example, as shown in FIG. 5, upper plate 56 has a pair of downwardly depending flanges 76 and 78 on its trailing edge which snugly engage the side faces of a projecting lug 80 formed along the trailing edge of arm portion 44. As shown in FIG. 3 and 7, plate 56 also has a downwardly depending flange 82 which engages a forward face 84 of arm portion 44 located intermediate the two groups of teeth.

Similarly, as shown in FIG. 5, lower plate 58 has a pair of upwardly extending flanges 86 and 88 which align with flanges 76 and 78 and abut against the side faces of projecting lug 80. As shown in FIG. 6, the knife-like leading edge 74 of the assembly is formed by bending the leading edge 90 of bottom plate 58 upwardly and rearwardly about the leading edge 92 of arm portion 44 into engagement with the leading edge of upper plate 56.

In this way, any impact forces imposed on knife-edge 74 and the cutting teeth are transmitted directly to arm 42. Thus, the bolt assemblies 60 are not subjected to any shear forces.

Another important feature of cutter assembly 40 is the manner in which the leading knife-edge 74 and the straight leading edge 94 of arm portion 43 are angled relative to each other to effectively form a tree hook 96 which moves a cut tree trunk around to the discharge side of the mower in the direction of rotation of disc 36. Knife-edge 74 and edge 94 are angled such that the hook 96 is formed on the trailing side of a radius line X extending between the center of rotation of disc 36 and the outermost edge of knife-edge 74. Because of this, a tree trunk cannot be released from the hook section 96 by centrifugal force alone and, thus, the lower end of the trunk will be carried around to the side of the mower to a release position where the cutter assembly 40 begins to again pass underneath the housing 28.

As shown best in FIGS. 1–3, housing 28 is provided with a tree releasing abutment 98 which intersects the rotational path of knife-edge 74 and hook 96. The side edge section 99 of housing 28 is abruptly angled rearwardly from abutment 98. Consequently, as cutting assembly 40 passes beneath abutment 98 and edge section 99, the tree trunk, which of course is also being pushed by bar 26, will be released by hook 96 and directed to the discharge side of the machine out of its path of advancement.

At its discharge side, housing 28 also has a riser limb guard 100 adjacent abutment 98 and edge section 99 to deflect any limbs or cut material to the side of the machine to keep the material out of the vehicle wheels and protect the operator from injury.

With reference now to FIGS. 1, 2, and 8–10, the falling tree controller 24 includes the pusher bar 26 which extends across the entire path of travel of vehicle 20 and the cutting circle of mechanism 22. The bar is angled rearwardly to generally face the discharge side of the vehicle and to direct the cut trees to the discharge side.

Bar 26 is pivotally connected to the forward ends of a pair of pipe 102 and 104 which extend through and are telescopically slidable within larger diameter pipes 106 and 108, respectively. Pipes 106 and 108 are supported in an elevated position on vehicle 20 by U-shaped vertical forward and rearward frame assemblies 110 and 112, respectively.

Forward assembly 110 (FIG. 9) includes a pair of upright posts 114 and 116 adjustably mounted at their lower ends to the main vehicle frame and connected at their upper ends by a transverse support beam 118. A beam 120 is fixed to the bottom of pipes 106 and 108 and is pivotally connected by a pin 122 to beam 118 so that beam 120 and the pipes resting thereon are pivotally slidable on support beam 118.

Rearward frame assembly 112 (FIG. 10) also includes a pair of upright posts 124 aNd 126 adjustably mounted at their lower ends to the main vehicle frame. A first transverse beam 128 is fixed to the upper ends of posts 124 and 126 and a second transverse beam 130 is spaced above beam 128, and connected thereto by members 132 and 134. A cross bar 135 is fixed between outer pipes 106 and 108 just ahead of frame assembly 112. The rear ends of outer pipes 106 and 108 loosely extend between beams 128 and 130 for limited lateral shifting movement.

As shown best in FIGS. 2 and 8, the rear ends of inner pipes 102 and 104 extend through outer pipes 106 and 108 and are connected by a transverse pipe 136. Another transverse member 138 is connected between the rear portions of pipes 102 and 104 and a pair of tensioning springs 140 and 142 extend between member 138 and the fixed support beam 118 of the forward frame assembly 110.

Springs 140 and 142 normally bias pipes 102 and 104 to their forwardmost positions and are placed under tension when bar 26 engages a tree and the pipes 102 and 104 move rearwardly with pipes 106 and 108. In this way, the biasing force against a tree is automatically adjusted by the tension in the springs. The springs are tensioned only as much as necessary to direct a tree off to the discharge side of the vehicle. For example, referring to FIG. 2, assume a tree is engaged by the end of bar 26 adjacent the desired discharge side of the vehicle, meaning, of course, that the tree need not be pushed very hard or far to remove it from the path of the vehicle. In such a case, pipes 102 and 104 will not move rearwardly to any great extent before the cutting assemblies 40 begin to cut the tree, and springs 140 and 142 will not be stretched very much. Consequently, the pushing force applied against the tree will not be very great, but will be sufficient to push the tree off to the discharge side of the vehicle. However, assume that the other end of the bar 26 remote from the discharge side of the vehicle engages another tree, which then must be pushed with a greater force across the entire path of the vehicle to the discharge side. Upon engagement of the remote end of bar 26 with the tree, pipes 102 and 104 will move a greater distance rearwardly within pipes 106 and 108 before cutter assemblies 40 begin to cut. Consequently, springs 140 and 142 will be stretched a great deal to produce automatically a greater biasing force of sufficient magnitude to push the tree across the entire width of the vehicle off to the discharge side.

As a result of the action of springs 140 and 142, only the required biasing or pushing force is automatically applied against a tree to discharge it in the desired direction. No energy is lost through the production of excessive pushing forces and no adjustment is required by the operator.

A cushioning spring 144 is positioned around each pipe 102 and 104 between the cross member 138 and the rear ends of outer pipes 106 and 108. Springs 144 prevent any excessive metal-to-metal impact between member 138 and pipes 106 and 108 when a tree is suddenly felled and discharged and pipes 102 and 104 quickly move forwardly. A cushioning coil spring 146 is housed within the connecting member 132 and abuts against the side of pipe 106.

A transverse tensioning spring 147 is connected between outer pipe 108 and fixed beam 128 to normally pull on pipe 108 to pivot the entire controller 24 about pin 122. This will normally position bar 26 and pipes 102 and 104 as shown in FIGS. 2 and 8 so that bar 26 will tend to push a tree in the desired direction of fall to the discharge side of the vehicle.

Reinforcing beams 148 and 150 may be welded on the top of outer pipes 106, 108, respectively, with the beams terminating short of rear frame 112. Also, a reinforcing bar 152 extends longitudinally between beams 118 and 128 to stabilize the tree controller frame structure.

As noted above, the U-frame 110 and 112 are adjustable vertically on the frame of the vehicle to selectively vary the working height of pusher bar 26.

In summary operation, an operator will advance the vehicle into the land area which is to be cleared. As the cutter assemblies 40 are rotated, the knife-edge 74 will quickly cut through the light material such as shrubs, briars, etc. When the pusher bar 26 engages a tree or trees in the path of advancement of the vehicle, pipes 102 and 104 will move rearwardly within pipes 106 and 108, respectively, and springs 140 and 142 will be stretched to automatically provide a biasing force against the tree tending to push the tree toward the desired direction of discharge. This biasing force is maintained on the tree as the vehicle continues to advance and the teeth on cutter plates 56 and 58 cut through the tree trunk immediately adjacent ground level. When a tree trunk is completely severed, the lower end of the trunk is grasped within the hook section 96 of the respective cutter assembly 40 and, as the assembly continues to rotate, the trunk is carried around to the discharge side of the vehicle, with the upper end of the trunk being pushed by the angled pusher bar 26. When the cutter assembly 40 begins to return underneath housing 28, the tree trunk will engage abutment 98 and the abruptly angled section 99 and will thus be discharged off to the side of vehicle 20 out of its path of advancement.

During the cutting operation, pusher bar 26 and pipes 102, 104, 106 and 108 will pivot slightly under spring tension about the pin connection 122. However, transverse spring 147 will maintain a tension force on pipe 108 and tend to position bar 26 toward the direction in which the tree is to be discharged. When the bar 26 engages a tree initially, controller 24 will pivot clockwise about pivot 122 (as viewed in FIGS. 2 and 8) and will become cocked under the tension of spring 147. When the tree is weakened or cut, controller 24 will sweep counterclockwise and create a sideway thrust on the tree in the direction of fall. This feature assists in properly directing the fall of the tree and removing the cut material out of the path of the vehicle and mechanism 22.

In practice, the described mowing apparatus is very quick and effective in clearing densely covered land areas such as timberland. The vehicle may be advanced substantially continuously along a predetermined path without interruptions or delay. At any one time, pusher bar 26 may be in engagement with more than one tree, but this will not affect operation of the mowing apparatus, since the pipes 102 and 104 are free to adjust themselves automatically lengthwise to whatever degree is necessary to permit the cutters to function. Also, since the direction in which all the cut material is discharged is automatically controller, the operator will not be overly concerned with obstacles lying in the path of travel, thus, the speed of operation is greatly increased.

The cutter assemblies 40 are especially unique in that they include relatively few teeth, but yet are capable of operating at high speeds to quickly cut through heavy trees. Also, should any teeth become damaged, it is only necessary to replace the appropriate plate 56 or 58. This reduces repair and replacement costs significantly over former machines.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Mowing apparatus for cutting trees or the like comprising a vehicle, a cutter mechanism connected to said vehicle and positioned adjacent ground level, controller means connected to said vehicle and positioned above said cutter mechanism for engaging a tree and directing its fall, said cutter mechanism comprising a rotating support, a radially projecting arm connected to said support, cutter plate means replaceably mounted on the outer end of said arm and having a plurality of cutting teeth formed at its outer peripheral edge and a knife edge formed on at least part of its leading edge, said cutting teeth being arranged in sets with the set of teeth closest to the leading edge of said plate means cutting on a smaller diameter than the set closest to the trailing edge of said plate means.

2. Mowing apparatus as defined in claim 1, wherein each set of teeth comprises at least one leading crosscut saw tooth followed by a trailing rip-saw tooth.

3. Mowing apparatus for cutting trees or the like comprising a vehicle, a cutter mechanism connected to said vehicle and positioned adjacent the ground level, controller means connected to said vehicle and positioned above said cutter mechanism for engaging a tree and directing its fall, said cutter mechanism comprising a rotating support, a radially projecting arm connected to said support, cutter plate means replaceably mounted on the outer end of said arm and having a plurality of cutting teeth at its outer peripheral edge and a knife edge formed on at least part of its leading edge, said cutter plate means including upper and lower plates removeably mounted on said arm, each of said plates having cutting teeth formed thereon, and one of said plates having its leading edge forming said knife edge.

4. Mowing apparatus as defined in claim 3, said upper and lower plates having flange means depending transversely of the cutting planes of said plates and engaging cooperating surfaces on said arm, whereby shear forces created during a cutting operation are transmitted directly to said arm.

5. Mowing apparatus for cutting trees or the like comprising a vehicle, a cutter mechanism connected to said vehicle and positioned adjacent ground level, controller means connected to said vehicle and positioned above said cutter mechanism for engaging a tree and directing its fall, said cutter mechanism comprising a rotating support, a radially projecting arm having an inner portion connected to said support and an outer portion, cutter plate means replaceably mounted on said outer portion of said arm and having a plurality of cutting teeth formed at its outer peripheral edge, a knife edge formed along the leading edge of said outer arm portion and said cutter plate means, said knife edge being so angled relative to a radius line extending between the center of rotation of said support and the outer portion of said knife edge such that a hook is provided on the trailing side of said radius line to assist in directing a cut tree to said discharge side of said vehicle.

6. Mowing apparatus as defined in claim 5, wherein the inner portion of said arm includes means pivotally connecting said arm to said support, a stop member fixed to said connecting means and pivotable therewith, and stop means mounted on said support and engageable with said stop member to hold said arm in a forward direction relative to said support, whereby the position of said arm and cutter plate means is fixed as they approach a tree, but the arm and plate means are pivotable in a rearward trailing direction when necessary to prevent damage thereto.

7. Mowing apparatus as defined in claim 5, said cutting mechanism including a housing above said support and cutter assembly, said housing having means adjacent said discharge side of said vehicle to disengage a tree from said hook and discharge said tree along said discharge side of said vehicle.

8. Mowing apparatus as defined in claim 5, said controller means comprising a pusher bar extending transversely of said vehicle across its path of advancement, upright frame means mounted on said vehicle, support means connecting said pusher bar to said upright frame means and permitting longitudinal movement of said bar between forward extended and rearward retracted positions, and means for normally biasing said bar toward its forward extended position.

9. Mowing apparatus as defined in claim 8, said support means comprising at least one inner member longitudinally slidably received within an outer member which is mounted on said upright frame means.

10. Mowing apparatus as defined in claim 8, said upright frame means comprising longitudinally spaced forward and rearward frame assemblies, said support means comprising a pair of longitudinally extending inner members slidably received within a pair of outer tubular pipes, said pusher bar extending angularly between the forward ends of said inner members to direct a tree toward said discharge side of said vehicle, a transverse member extending between the forward end of said outer pipes and being pivotally connected to said forward frame assembly at said discharge side of said vehicle, the rearward end of said outer pipe being mounted on said rearward frame assembly for limited transverse movement, and said biasing means including spring means acting between said inner members and one of said frame assemblies to urge said pusher bar to its forward extended position.

11. Mowing apparatus as defined in claim 10, comprising second spring means acting between one of said outer pipes and said rearward frame assembly to cause said pusher bar to be pivoted toward the discharge side of said vehicle.

12. Mowing apparatus as defined in claim 10, wherein said frame assemblies are vertically adjustable on said vehicle to adjust the working height of said pusher bar against a tree.

13. A falling tree controller for use with a mowing vehicle comprising upright frame means mounted on said vehicle and including longitudinally spaced forward and rearward frame assemblies, support means mounted on said frame assemblies and including a pair of longitudinally spaced forward and rearward frame assemblies, support means mounted on said frame assemblies and including a pair of longitudinally extending inner members slidably received within a pair of outer tubular pipes, a pusher bar extending angularly between the forward ends of said inner members across the path of advancement of said vehicle to direct a tree toward a discharge side of said vehicle, said inner members being slidable within said other members to permit longitudinal movement of said bar between forward extended and rearward retracted positions, a transverse member extending between the forward end of said outer pipes and being pivotally connected to said forward frame assembly at said discharge side of said vehicle, the rearward end of said outer pipes being mounted on said rearward frame assembly for limited transverse movement, and biasing means including spring means acting between said inner members and one of said frame assemblies for normally biasing said pusher bar toward its forward extended position.

14. A falling tree controller as defined in claim 13, comprising second spring means acting between one of said outer pipes and said rearward frame assembly to cause said pusher bar to be pivoted toward the discharge side of said vehicle.

15. A falling tree controller as defined in claim 13, wherein said frame assemblies are vertically adjustable on said vehicle to adjust the working height of said pusher bar against a tree.

16. A cutter mechanism for use in a rotary mower comprising a rotating support, a radially projecting arm mounted on said support, cutter plate means replaceably mounted on the outer end of said arm and having a plurality of cutter teeth at its outer peripheral edge and a knife edge formed on at least part of its leading edge, said cutter teeth being arranged in sets with the set of teeth closest to the leading edge of said plate means cutting on a smaller diameter than the set closest to the trailing edge of said plate means.

17. A cutter mechanism as defined in claim 16, wherein each set of teeth comprises at least one leading cross-cut saw tooth followed by a trailing rip-saw tooth.

18. A cutter mechanism for use in a rotary mower comprising a rotating support, a cutter assembly including a radially projecting arm connected to said support and cutter plate means replaceably mounted on the outer end of said arm, said cutter plate means comprising upper and lower plates removeably mounted on said arm, each of said plates having cutting teeth formed on their outer peripheral edge and one of said plates having its leading edge forming a knife edge.

19. A cutter mechanism as defined in claim 18, said upper and lower plates having flange means depending transversely of the cutting planes of said plates and engaging cooperating surfaces on said arm, whereby shear forces created during a cutting operation are transmitted directly to said arm.

20. A cutter mechanism for use in a rotary mower comprising a rotating support, a cutter assembly including a radially projecting arm connected to said support, cutter plate means replaceably mounted on the outer portion of said arm and having a plurality of cutting teeth formed on its outer peripheral edge, a knife edge formed along the leading edge of said outer arm portion and said cutter plate means and being so angled relative to a radius line extending between the center of rotation of said support and the outer portion of said knife edge such that a hook is provided on the trailing side of said radius line to assist in directing cut material to a discharge side of the mower.

21. A cutter mechanism as defined in claim 20, wherein the inner portion of said arm includes means pivotally connecting said arm to said support, a stop member to hold said arm in a forward direction relative to said support, whereby the position of said arm and cutter plate means is fixed as they approach a tree, but the arm and plate means are pivotable in a rearward trailing direction when necessary to prevent damage thereto.

22. A cutter mechanism as defined in claim 20, including a housing above said support and cutter assembly, said housing having means adjacent said discharge side of the mower to disengage cut material from said hook and discharge said material along the discharge side of the mower.

23. Apparatus for cutting trees or the like comprising a vehicle, a cutter assembly connected to said vehicle and positioned adjacent ground level, controller means connected to said vehicle and positioned above said cutter assembly for engaging a tree and directing its fall, said cutter assembly including a rotatable support member and a radially projecting arm mounted on said support member, said arm having cutter teeth at its outer peripheral edge and a knife edge formed along at least part of its leading edge, said knife edge being angled relative to a radius line extending between the center of rotation of said support member and the outer portion of said knife edge such that a hook is provided on the trailing side of said radius line to assist said controller means in directing a cut tree to a predetermined discharge side of said vehicle out of the path of advancement of said vehicle.

24. Apparatus as defined in claim 23, said cutter assembly including a housing having means adjacent said discharge side of said vehicle to disengage a tree from said hook and discharge said tree along said discharge side of said vehicle.

25. Apparatus as defined in claim 23, said controller means comprising a pusher bar extending angularly across the path of advancement of said vehicle to direct a tree toward said discharge side of said vehicle.

26. Apparatus as defined in claim 25, said cutter assembly including a housing having means adjacent said discharge side of said vehicle to disengage a tree from said hook and discharge said tree along said discharge side of said vehicle.

* * * * *